United States Patent
Ehrich et al.

[15] 3,647,494
[45] Mar. 7, 1972

[54] PROCESS FOR MAKING SOLID SOLUTIONS OF QUINACRIDONE AND DERIVATIVES THEREOF

[72] Inventors: Felix Frederick Ehrich, Westfield, N.J.; William J. Marshall, Wilmington, Del.

[73] Assignee: E. I. du Pont de Nemours and Company, Wilmington, Del.

[22] Filed: Aug. 27, 1969

[21] Appl. No.: 853,530

Related U.S. Application Data

[63] Continuation of Ser. No. 515,229, Dec. 20, 1965, abandoned.

[52] U.S. Cl. .......................................106/288 Q, 106/309
[51] Int. Cl. ..........................................................C08h 17/02
[58] Field of Search .......................106/288 Q, 309; 260/279

[56] References Cited

UNITED STATES PATENTS 3,148,075   9/1964   Ehrich ..............................106/288 Q
3,251,845   5/1966   Jaffe ......................................260/279

Primary Examiner—James E. Poer
Attorney—Frank R. Ortolani

[57] ABSTRACT

A solid solution of a quinacridone and the quinacridonequinone corresponding thereto is made by a process including the step of digesting, in the temperature range of 50° C. to the boil, an aqueous, acidic dispersion of the quinacridone in comminuted condition in the presence of an amount of a chromate oxidizing agent stoichiometrically sufficient to oxidize a desired proportion of the quinacridone to quinacridonequinone.

6 Claims, No Drawings

PROCESS FOR MAKING SOLID SOLUTIONS OF QUINACRIDONE AND DERIVATIVES THEREOF

This application is a continuation of application Ser. No. 515,229 filed Dec. 20, 1965, now abandoned.

This invention relates to new processes for making solid solutions which comprise both quinacridones and quinacridonequinones as essential components, and is more particularly directed to such processes wherein the quinacridonequinone component is formed from a portion of the previously comminuted quinacridone component, by oxidizing it by digestion in an acidic, aqueous chromate-containing dispersion at an elevated temperature in the range of from about 50° C. to the boil.

An object of this invention is to provide an improved method of making solid solutions of quinacridones and quinacridonequinones, such as described in U.S. Pat. No. 3,160,510 issued Dec. 8, 1964, to F. F. Ehrich, which solid solutions may involve mixtures of more than one quinacridone component with more than one quinacridonequinone component. Other objects will appear hereinafter.

In carrying out this invention the particle size of a quinacridone component which, if desired, can be a mixture of two or more quinacridone compounds, is reduced by either of two well-known comminuting techniques, salt milling or acid pasting. It is then dispersed in a strongly acid, aqueous solution, such as is commonly used for the extraction of a salt-milling powder or is the end result of drowning the acid-pasting mixture. This strongly acid slurry is then digested with the amount of a chromate oxidizing agent stoichiometrically required to convert a desired proportion of quinacridone to quinacridonequinone, the digestion being continued for a substantial period at an elevated temperature, preferably near the boiling point. When the pigment is isolated from this mixture, it is found to consist of a solid solution of the quinacridone component and the quinacridonequinone component in the expected proportions, and this solid solution is found to be present in a highly desirable crystal form which often exhibits superior tinctorial properties and superior lightfastness compared to prior art solid solution pigments of similar composition.

The examples shown hereinbelow emphasize solid solutions containing unsubstituted quinacridone and unsubstituted quinacridonequinone; however, example 3 shows a mixture of quinacridone with the substituted 4,11-dichloroquinacridone and the corresponding quinacridonequinone resulting from oxidation of this mixture, and it will be understood that the process is applicable to the preparation of substituted products. The quinacridonequinone component will contain the same substituents as the quinacridone since it is made by direct oxidation of the latter; however, the process is adaptable to solid solutions containing a variety of substituted quinacridone derivatives and the corresponding quinacridonequinones as well as mixtures of these as shown in the examples. Thus, one can make a solid solution of 2,9-dichloroquinacridone and 2,9-dichloroquinacridonequinone by this method; likewise, solid solutions containing 2,9-dimethylquinacridone and its corresponding quinacridonequinone or of 2,9-dimethoxyquinacridone and its corresponding quinacridonequinone are equally adaptable to manufacture by this process. Since many other quinacridones are known and are capable of forming corresponding quinacridonequinones by oxidation, those skilled in the art will be able to make various combinations by the generic process of this invention.

Processes of the invention make it possible to prepare solid solutions over a wide range of amounts of quinacridonequinone components in the mixture. The specific examples disclose variation from more than 75 percent quinacridonequinone down to as little as 40 percent quinacridonequinone. These are not critical limits, and the possible variation extends still farther than indicated. A completely unexpected feature is found in that even with as much as 75 to 85 percent quinacridonequinone, the products often exhibit excellent lightfastness, notably superior to prior art solid solutions of similar composition.

The amount of quinacridonequinone component in the mixture is easily controlled by adjustment of the amount of oxidizing agent used. Since the oxidation of quinacridone to the corresponding quinone proceeds in accordance with the equation—$C_{20}H_{12}O_2N_2 + Cr_2O_7^{=} + 8H^+ \rightarrow C_{20}H_{10}O_4N_2 + 2Cr^{+++} + 5H_2O$—it is possible to calculate the amount of oxidant needed to produce the desired proportion of the quinacridonequinone.

The chromate ion used as the oxidizing agent may be readily obtained either from chromic acid ($CrO_3$) dissolved in water or from sodium chromate or sodium dichromate used in strongly acid solution. All of these raw materials are commercially available and readily obtainable in both crystalline and solution forms. The only requirements are that the purity be known and that the amount used be based upon this calculated need. The chromate-containing compound used may be added either as a crystalline material, in which case it immediately goes into solution, or, preferably added as a solution in water.

The particle size reduction prior to the oxidation step is an essential part of the preparation of the solid solutions according to processes of this invention, and the method by which the particle size reduction is accomplished appears to have a considerable degree of criticality. Both salt milling and acid pasting are useful procedures in that they result in extremely small particles which are readily susceptible both to the necessary oxidation step and to the subsequent recrystallization which is essential to the formation of the solid solutions.

The salt-milling process shown in the examples is one involving milling in the presence of hydrated aluminum sulfate and of a small amount of an organic solvent such as tetrachlorethylene, but the choice of this procedure is not critical and simple salt milling in the presence of sodium chloride is also useful. Likewise, milling in the presence of a mixture of salt and anhydrous aluminum chloride or of ammonium sulfate and anhydrous aluminum chloride is equally useful. The length of time required for an effective milling operation will vary materially with the size of the mill, but a useful average for a mill of, say 50–60 gallons capacity, is in the range of about 12 hours. In small laboratory mills, it may take considerably longer and in much larger plant mills times in the order of about 6 hours are useful. The optimum required time is readily determined by simple investigation. It is common in all salt-milling operations to extract the mill powder in an acid medium to remove any residual metal particles picked up from the mill and the grinding elements, and it is often convenient to add the oxidizing agent to this standard acidic extraction medium.

It is also shown in some of the examples that particle size reduction may take place via the so-called "acid-pasting" procedure, which involves the solution of the quinacridone in strong sulfuric acid—usually 96–98% $H_2SO_4$—followed by drowning of this solution in water. It is particularly advantageous to effect this drowning in such a manner as to give extremely rapid dilution of the acid. A convenient method of doing this is to pump the acid solution into the throat of an orifice through which the water is passing under high turbulence. By proper adjustment of the relative amounts of acid solution and water, a very rapid dilution takes place, and it is possible to control the heat rise and the acid concentration of the resulting slurry. It is convenient, although not essential, to control the rate of dilution and amounts of ingredients so that the heat rise is in the order of 30° C. and the resulting acid slurry is in the order of 10–16 percent sulfuric acid. The quinacridone in such a mixture is readily oxidized on addition of the desired oxidizing agent, followed by heating.

Salt milling with anhydrous aluminum chloride produces a quinacridone-aluminum chloride complex which is decomposed by reaction with water, particularly in an acidic aqueous system. The pigment is regenerated in small particle size suitable for the oxidation step, and subsequent formation of the solid solution.

The formation of a solid solution of two or more components according to the present invention involves a simultaneous crystallization of the components into a common crystal lattice. This crystallization takes place in aqueous, acidic medium under the influence of the digestion at elevated temperatures.

The digestion at elevated temperatures takes place over a fairly wide range of temperatures and over a wide range of concentration of solid in the liquid medium. The concentration of this solid in the slurry is not critical. It should be adjusted to a point which gives a fluid, easily stirrable slurry, but the content of solid should not be excessively low because of the difficulty of removing relatively large amounts of the liquid. Also, of course, the handling of large amounts of slurry becomes uneconomical. The temperature of digestion has been shown in the examples as near the boiling point of the slurry, and this is preferred for most uses. However, temperatures of 50° C. or lower can be used, but with a considerable increase in the necessary time.

The time required to complete the crystallization appears to be relatively short, and digestion times in the order of 1 hour as shown in the examples are entirely satisfactory. Shorter times frequently are successful, and longer times may be used although they are not generally necessary nor do they offer any great advantages.

Processes of this invention have the advantage of eliminating any need for separate preparation of the quinacridonequinone components of the solid solutions produced. It has been known in the prior art to prepare a mixture of about 60 percent quinacridone and 40 percent quinacridonequinone by an oxidation procedure, but additional steps are necessary to obtain the desired solid solution. Other proportions of the two components have not been obtainable in this manner. Now, with this invention, it is possible to obtain any desired proportion of quinacridone and quinacridonequinone in a simple, straightforward step. Moreover, this step enables the preparation of solid solutions over a very wide range of composition. Finally, products prepared according to this invention often exhibit distinctly improved lightfastness over the products obtained by prior art processes for the preparation of solid solutions of similar proportions. It is believed that this improvement in lightfastness is the result of a marked improvement in the crystallinity of the product which seems to come about during the hot digestion of the pigment slurry.

The following examples illustrate this invention in more detail. Unless otherwise designated, all references to parts are to parts by weight.

EXAMPLE 1

A ball mill with an internal diameter of about 24 in. and a total capacity of about 60 gallons is charged with 1,000 lb. of "Cyl-Pebs" (cylindrical bars of iron approximately ½ in. in diameter and 1 in. long), 8 lb. of a crude quinacridone pigment in the gamma phase, 50 lb. of a commercial aluminum sulfate ($Al_2(SO_4)_3 \cdot 15-18H_2O$), and 1.1 lb. of tetrachloroethylene. The mill is rotated at about 40 r.p.m. for about 16 hours with temperature of the charge not exceeding about 60°-70° C. This mill is discharged through a suitable screen to retain the grinding elements in the mill.

Of the mill powder so obtained 336 parts (45.5 parts of quinacridone pigment) (0.147 mol) is added to 1,100 parts of water containing 77 parts of 98% $H_2SO_4$ and stirred until thoroughly wet. To this mixture 33.6 parts (0.113 mol) of sodium dichromate (48 parts of 69.9% solution of $Na_2Cr_2O_7 \cdot 2H_2O$) is added and the mixture heated to the boil, boiled 1 hour, filtered, washed and dried. The resulting product is an attractive gold pigment which exhibits the X-ray diffraction pattern of quinacridonequinone. Analysis shows it to contain about 23 percent quinacridone and 77 percent quinacridonequinone, this being also the theoretical degree of oxidation based on the chromate used. Since it has the characteristic X-ray pattern of only one component, it is a solid solution of quinacridone in quinacridonequinone. When the gold pigment is dispersed in a coating composition and panels made therefrom are exposed to sunlight and the elements, the product exhibits an attractive gold color of excellent lightfastness in contrast to the very poor lightfastness of quinacridonequinone itself.

EXAMPLE 2

The ball mill described in example 1 is charged as set forth therein, and the charge is milled for 24 hours and discharged through a suitable screen. Of the mill powder so obtained 168 parts (22.7 parts of quinacridone) is added to 1,000 parts of water containing 37 parts of 98% $H_2SO_4$ and stirred until wet, after which 6 parts of chromic oxide ($CrO_3$) is added and stirred to solution. The charge is heated to the boil, boiled 2 hours, filtered, washed and dried to give a pigment which is shown by analysis to contain about 59 percent quinacridone and 41 percent quinacridonequinone. It exhibits an X-ray diffraction pattern characteristic of quinacridonequinone with a slight shift in the positions of the peaks, and this X-ray pattern indicates the product to be a solid solution. When dispersed into a coating composition it produces an attractive maroon enamel of excellent durability and lightfastness.

EXAMPLE 3

The ball mill of example 1 is charged as therein described except that the pigment used is a mixture of 4.8 lb. crude gamma quinacridone and 3.2 lb. crude 4,11-dichloroquinacridone. The charge is milled for 15 hours and discharged through a suitable screen. Of the mill powder so obtained, 2,220 parts (180 parts quinacridone and 120 parts 4,11-dichloroquinacridone) is stirred into 7,250 parts of water containing 510 parts 98% $H_2SO_4$ until thoroughly wet, after which 59.5 parts of 69.9% solution of $Na_2Cr_2O_7 \cdot 2H_2O$ is added. The mixture is heated to the boil, boiled 2 hours, filtered, washed and dried to give 300 parts of an orange powder which contains about 15.6 percent of the oxidized species (a mixture of quinacridonequinone and 4,11-dichloroquinacridonequinone) but still exhibits substantially the X-ray pattern of the previously known solid solution of 60 percent quinacridone and 40 percent 4,11-dichloroquinacridone. The product is an attractive orange pigment of excellent lightfastness and durability.

EXAMPLE 4

In 1,000 parts of 96% $H_2SO_4$ 100 parts of crude gamma quinacridone is dissolved by stirring at 8° C. (±2°). When the solid is completely dissolved, the solution is introduced continuously through a small orifice into the center of a stream of cold water flowing under pressure through a constricted tube in a state of turbulent flow, the ratio of water to acid being about 10 to 1 and the temperature rise being on the order of 15° C. The resulting strongly acid slurry is treated by adding a solution of 59.3 parts of $Na_2Cr_2O_7 \cdot 2H_2O$ in 200 parts of water. It is heated to the boil, boiled 1 hour, filtered, washed free of soluble salts and dried to give 107 parts of a brilliant gold pigment comprising about 27.2 percent quinacridone and 72.8 percent quinacridonequinone associated in a solid solution exhibiting the X-ray diffraction pattern of quinacridonequinone with a slight shift in the positions of the lines. It exhibits a color quite similar to that of the product of example 1 and is equally lightfast.

EXAMPLE 5

In 1,000 parts of 96% $H_2SO_4$ 100 parts of crude gamma quinacridone is dissolved and the solution is drowned into cold water under conditions of high turbulence as described in example 4. Then 44.6 parts of 69.2% solution of $Na_2Cr_2O_7 \cdot 2H_2O$ is added to the strongly acid slurry which thereupon is heated to the boil and boiled 1 hour. It is filtered, washed free of soluble salts, and dried, to give 103.5 parts of a dark red powder consisting of about 60.7 percent quinacridone and about 39.3 percent quinacridonequinone which, as indicated by the X-ray diffraction pattern, are present principally as a solid solution of quinacridone in quinacridonequinone but with some excess quinacridone present. When dispersed in a coating composition, it produces an attractive maroon enamel of excellent durability and lightfastness, substantially like the product of example 2.

What is claimed is:

1. In a process for producing a solid solution comprising a quinacridone and the quinacridonequinone corresponding thereto and wherein the X-ray diffraction pattern of said solid solution is different from the sum of the X-ray diffraction patterns of its constituent quinacridones, the step comprising digesting, at a temperature in the range of about 50° C. to the boil, an aqueous, acidic dispersion of the quinacridone in comminuted condition, said comminuted quinacridone being provided by milling or acid pasting, there being present in the dispersion the amount of a chromate oxidizing agent stoichiometrically sufficient to oxidize a desired proportion of the quinacridone to the corresponding quinacridonequinone.

2. A process of claim 1 wherein the starting quinacridone is unsubstituted and the proportion of oxidizing agent used is stoichiometrically sufficient to give a product containing, by weight, about 60 percent quinacridone and 40 percent quinacridonequinone.

3. A process of claim 1 wherein the starting quinacridone is unsubstituted and the proportion of oxidizing agent used is stoichiometrically sufficient to give a product containing, by weight, about 25 percent quinacridone and 75 percent quinacridonequinone.

4. A process of claim 1 wherein the starting quinacridone is a mixture of, by weight, about 60 percent unsubstituted quinacridone and 40 percent 4,11-dichloroquinacridone, the proportion of oxidizing agent used is stoichiometrically sufficient to give about 15 to 16 percent of the corresponding mixed quinacridonequinones, and the comminuted condition of the starting material is achieved by salt milling.

5. A process of claim 1 wherein the oxidizing agent is sodium dichromate.

6. A process of claim 1 wherein the oxidizing agent is chromic acid.

* * * * *